March 22, 1938.  W. H. LONGSTREET  2,112,106
AIR INFLATION AND GAUGE DEVICE
Filed Nov. 26, 1935   3 Sheets-Sheet 2
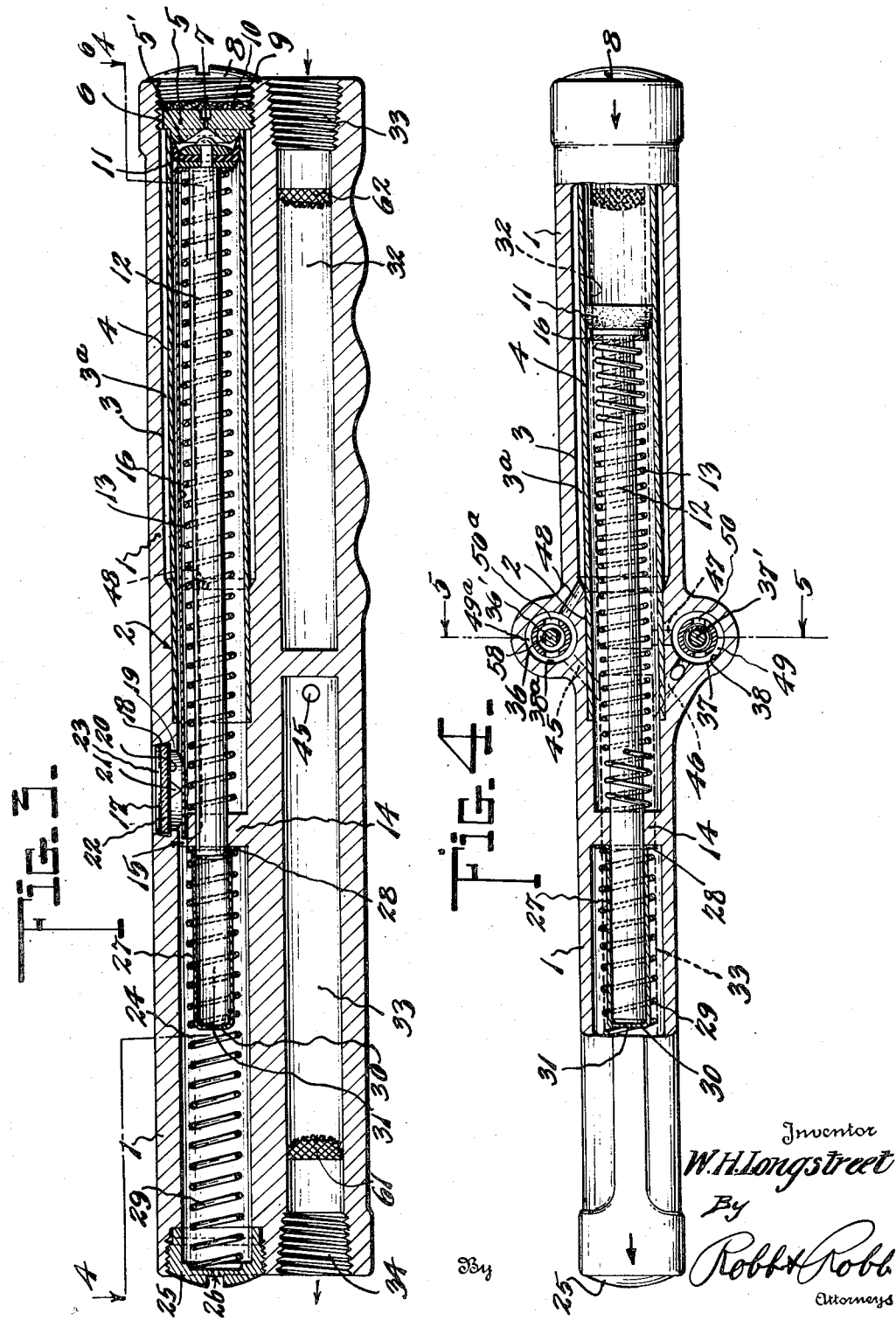
Inventor
W. H. Longstreet
By
Robt H Robb
Attorneys March 22, 1938. W. H. LONGSTREET 2,112,106
AIR INFLATION AND GAUGE DEVICE
Filed Nov. 26, 1935 3 Sheets-Sheet 3
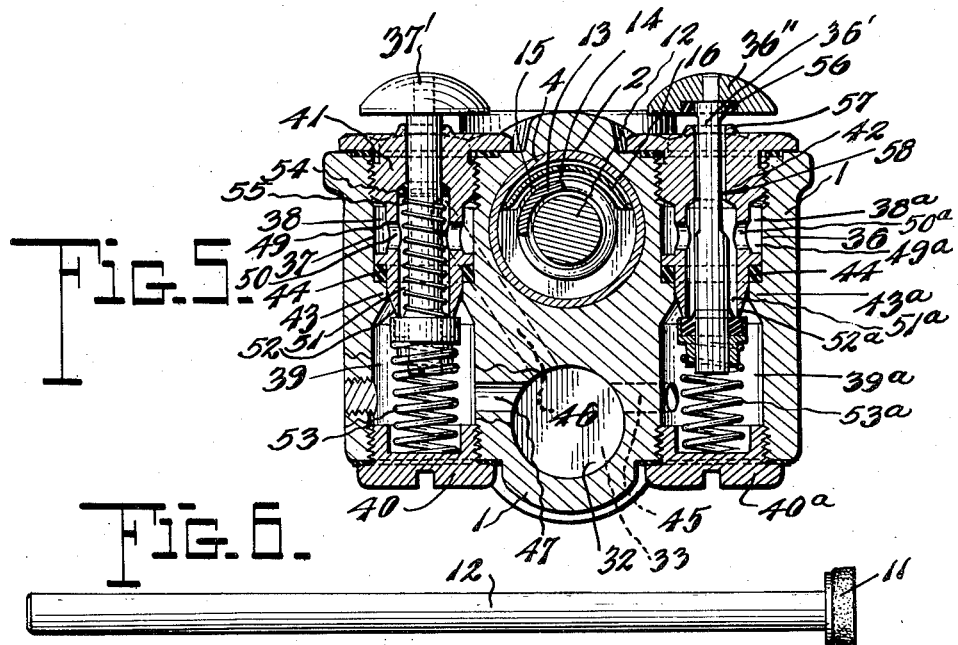
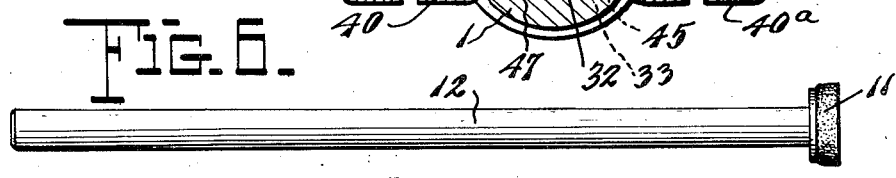
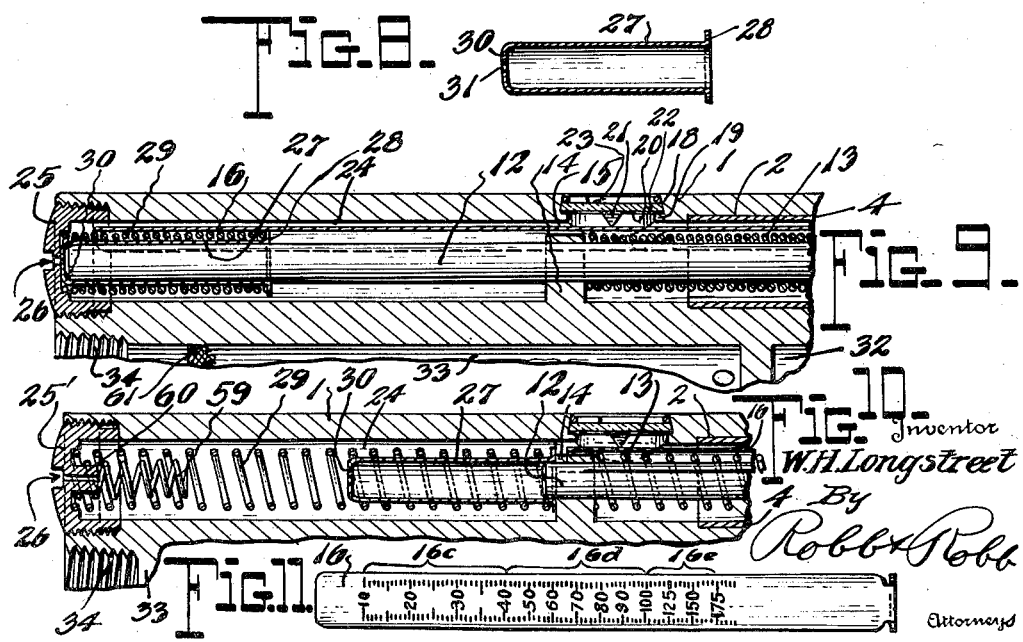

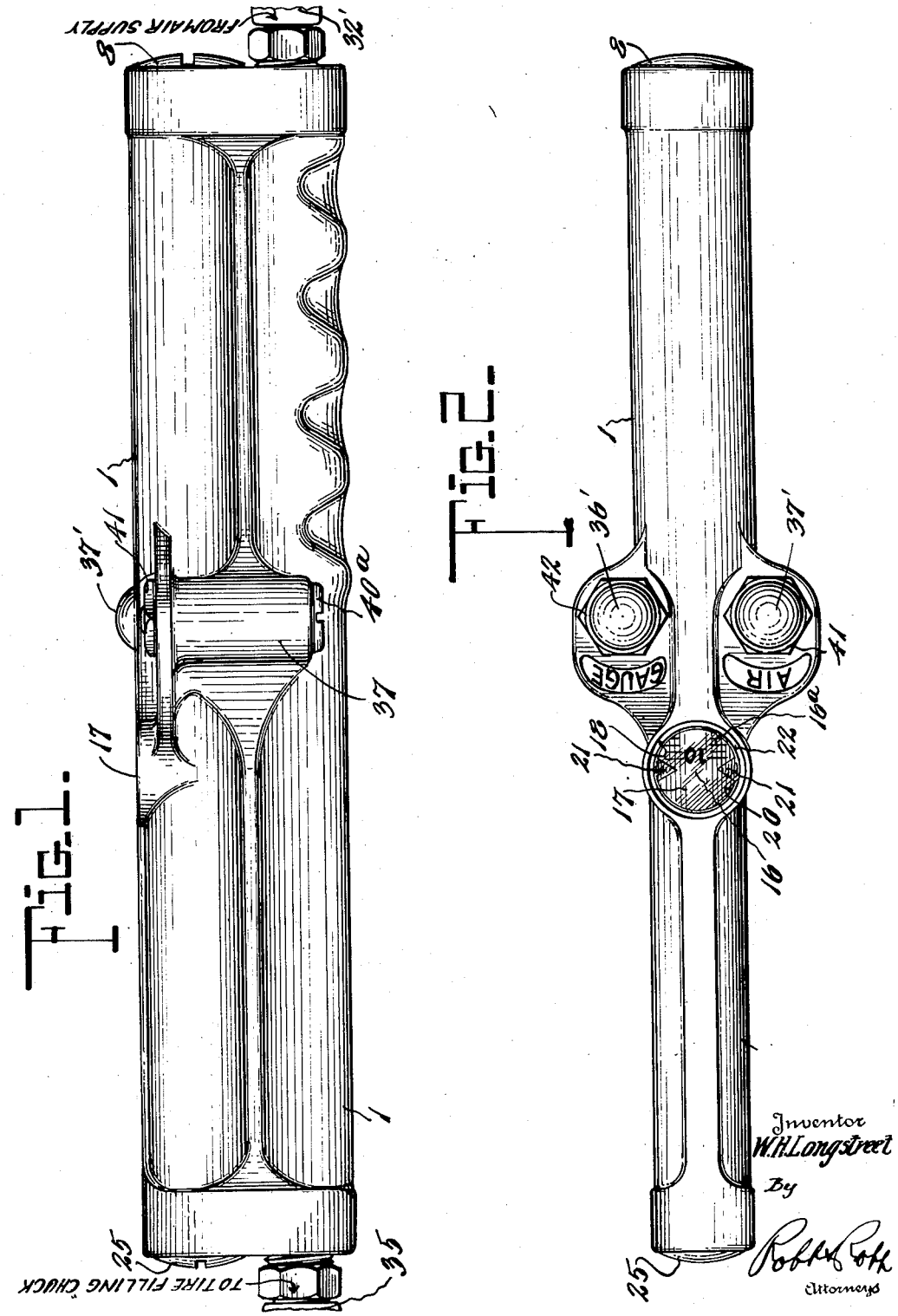

Patented Mar. 22, 1938

2,112,106

UNITED STATES PATENT OFFICE 2,112,106

AIR INFLATION AND GAUGE DEVICE

Walter H. Longstreet, Brooklyn, N. Y., assignor to Acme Air Appliance Company, Inc., Brooklyn, N. Y., a corporation of New York Application November 26, 1935, Serial No. 51,676

9 Claims. (Cl. 152—11.5)

This invention relates to gauge and tire inflation apparatus for use in inflating and deflating automobile tires and the like.

The object of the invention is to provide a tire gauge primarily intended for use in automobile service stations for testing and inflating vehicle tires.

Another object is the provision of an extremely accurate tire gauge which is automatically operable for use in testing and the inflation of both high pressure and low pressure vehicle tires and is readily usable by the average public. It is simple, compact, light in weight, inexpensive to manufacture and designed to stand the abuse to which these devices are subject in use.

A further object is the provision of a tire gauge in which the tire pressure may be readily indicated without the removal of the gauge from the tire and should the tire pressure be excessive the tire may be readily deflated to the desired pressure as indicated by the gauge.

A still further object is the provision in a tire gauge of a simple movable indicator member having low pressure indicia thereon for use with low pressure tires, said indicator also having high pressure tire indicia for use with high pressure tires and means for automatically controlling the indicator according to the said pressures to be dealt with.

It is also an objective to provide a manually controllable valve means for causing the tire pressure to operate the indicator member and also when desired to deflate or inflate the tire being tested.

Another object in view is the provision of means whereby the service pressure from the particular air reservoir or pump may readily be indicated on the gauge and by means of which the operating condition of the pumping means usually remotely located may be determined.

A still further specific object is the provision of a tire gauge having a main indicator means tensioned for low pressure tire gauging and a supplemental tensioning means successively operable in conjunction with the main tensioning means for high pressure tire gauging together with a single indicator having high and low pressure indication thereon, the indicator having a piston member operable by said pressures for actuating the indicator against the resistance offered by the main and secondary tensioning means together with safety stop means for the piston to prevent overloading of the springs.

A further object is the provision of a pressure fluid supply gauge for tires having a pressure operated indicator device, an inlet passage for admitting the pressure fluid to the gauge and a fluid pressure outlet conduit for discharging the fluid to the tire and valve means for establishing communication between the inlet and outlet conduits and a second control means for establishing communication between the outlet and the pressure operated indicating device.

Another object is the provision of a tire gauge and inflating device having a pressure operated indicator, an outlet for connection with a tire, an inlet for connection with the source of pressure, valve means for connecting the inlet passage directly with the outlet passage, and supplemental valve means connecting the outlet passage with the indicator member, said supplemental means being also movable to connect the outlet with the atmosphere.

Other and further objects of the invention will be hereinafter set forth and the novel features thereof defined by the appended claims.

Referring to the drawings in which like reference characters refer to like parts, Fig. 1 is a side elevation of my improved tire inflation gauge with supply line to the pressure reservoir, and the line or conduit to the tire inflation chuck being broken away.

Fig. 2 is a top plan view of the parts seen in Fig. 1.

Fig. 3 is a vertical longitudinal sectional view taken through my improved device.

Fig. 4 is a longitudinal horizontal section taken on the line 4—4 of Fig. 3.

Fig. 5 is a vertical transverse sectional view on line 5—5 of Fig. 4 looking in the direction of the arrows.

Fig. 6 is a detail elevation of the gauge piston and guide rod.

Fig. 7 is a plan view of the pressure indicator member.

Fig. 8 is a longitudinal section view through the auxiliary or high pressure spring carrier.

Fig. 9 is a fragmentary vertical longitudinal sectional view of the left hand upper portion of Fig. 3 showing the parts in their maximum pressure indicating position.

Fig. 10 is a fragmentary view taken on the same plane as Fig. 9 but showing a modified embodiment in which a third or service pressure auxiliary spring is used.

Fig. 11 is a plan view on a slightly reduced scale of the indicator for use with the construction shown in Fig. 10 and clearly disclosing the indicia arrangement thereon.

Referring particularly to Figs. 3, 4, and 5, my improved tire inflation gauge comprises a body or casing 1 having a longitudinal bore 2 extending inwardly from one end of the body. This bore is enlarged at 3 for a purpose later to be described. A plunger cylinder 4 is securely held in place within the bore 2 by the threaded plug 5 which is tightly screwed against the end of the cylinder 4.

The periphery of the plug 5 is provided with a notch 6 while the central portion is provided with an air inlet aperture 7 to admit air into one end of the cylinder 4. A closure plug 8 is threaded into the end of the bore 3 to seal the same against the gasket member 9, there being a felt or other suitable filtering washer 10 disposed between the threaded plug 5 and the closure plug 8.

Reciprocally mounted within the cylinder 4 is the pressure operated piston member 11 having secured thereto the guide or plunger rod 12. Opposing the movement of the piston member 11 is the low pressure or primary tensioning means or spring 13 which normally maintains the piston member 11 in engagement with the tapered end 5' of the plug 5. The other end of the spring rests against the boss or partition 14 which is also apertured to form a guide for the piston rod 12.

The upper portion of the partition or boss 14 is formed with a curved slot 15 to receive the outer end of the indicator member 16, said indicator member being formed of a sheet of flat material curved longitudinally as seen in Fig. 7 and having one end bent downwardly and apertured to fit on the piston rod 12, the spring 13 securely holding the apertured end of the indicator member against the piston 11.

As seen in Fig. 5, the edges of the indicator 16 are slightly curved outwardly so as to engage the ends of the curved slot 15 and thus maintain the indicator in spaced relation with respect to the inner wall of the cylinder 4 and the spring 13, while at the same time providing a line contact for the indicator, which prevents the calibrated surface of indicator 16 from coming in contact with the inner walls of cylinder 4 and thus marring the finish.

A sight opening 17 is formed in the body 1 directly over the indicator member 16 as clearly seen in Fig. 3 of the drawings. The sight opening comprises a downwardly and outwardly tapering aperture 18 having an indicia retaining rim or flange 19 upon which is disposed the ring member 20 having the indicator arrows 21. Glass 22 is retained tightly against the ring 20 by the locking ring 23 due to its expansion against the tapering wall of the recess.

The guide or piston rod 12 projects slightly beyond the boss or partition 14 into the auxiliary spring chamber 24 which is suitably closed by the threaded plug 25, said plug having a small relief opening 26.

The auxiliary or supplemental spring carrier 27 comprises a sleeve member of slightly larger internal diameter than that of the piston rod 12 so that it may freely slide thereinto, the end of the sleeve member being flanged at 28 for engagement with the auxiliary spring or secondary tensioning means 29.

The opposite end of the sleeve member is closed at 30 with the exception of the bleed opening 31 so as to provide an escape for any air that should be trapped in the sleeve member as the piston rod moves toward the closed end. It should be here observed that the piston rod 12 will move a predetermined distance before it strikes the closed end 30 of the auxiliary spring carrier whereupon the resistance to movement of the auxiliary spring must be overcome in addition to that of the main or low pressure tensioning means 13, this auxiliary tensioning means being hereafter referred to as the high pressure tensioning means.

The length of the sleeve member 27 being slightly greater than the maximum compression length of the high pressure spring 29, it will be observed that the closed end 30 will strike the inner end of the plug member 25 and thus prevent distortion or damage to this spring should excessive pressure be applied to the piston member 11. Likewise the degree of movement of the piston rod 12 before it shifts the sleeve member 27 against the plug 25 is less than the maximum compression of the low pressure tensioning spring 13 and thus this spring cannot be compressed to a degree whereby it may be damaged.

Longitudinally formed within the body 1 below the plunger cylinder 4 is the fluid pressure inlet chamber 32 while at the opposite end of the gauge below the high pressure spring chamber is the outlet chamber 33. The inlet chamber 32 is designed to be connected to any suitable air pump or pressure supply by the conduit 32', this construction forming no particular part of my invention, only the extreme end of the hose and its attaching nipple being shown in Fig. 1 of the drawings.

The outlet conduit 33 is threaded at 34 to receive the threaded end of the flexible connector 35 which is provided with the usual tire inflation chuck.

Referring now to Figs. 1, 2, 4, and 5, the body 1 is provided intermediate its length and at either side of the bore 2 with valve chambers 36, 37. The valve chamber 36 has disposed therein the gauge control valve 36' which performs two functions. When partly depressed it allows pressure from the tire being inflated or tested to escape to atmosphere. When fully depressed, the tire pressure is allowed to enter the cylinder 4 and move the piston member against the tension of the springs 13 and 29.

The chamber 37 has disposed therein the air control valve 37', this valve being primarily for the purpose of admitting air to the tire being inflated. The valve chambers 36 and 37 are somewhat similar in construction with the exception of the location of the passages leading therefrom and each comprises an upper chamber 38, 38a and a lower chamber 39, 39a, the lower chambers being closed by the threaded plugs 40, 40a while the upper chambers are closed by the thread shanks 41, 42 of the valve units, each readily replaceable fully assembled.

A shoulder 43, 43a is formed in each of the valve chambers between the upper and lower portions thereof to receive the sealing gaskets 44 against which the flanged end of the valve unit bodies 41 and 42 are forced. The inner end of the outlet chamber 33 has a conduit 45 leading therefrom to the lower portion 39a of the gauge valve chamber 36. A similar passage or conduit 46 also leads from the outlet chamber 33 to the upper portion 38 of the air valve chamber 37.

The air inlet chamber 32 is provided with a passage 47 at its inner end which establishes communication between the chamber and the lower end or portion 39 of the air valve chamber 37. A fourth conduit or passage 48 establishes communication between the upper portion 38a of the gauge valve chamber 36 and a space 3a between the enlarged bore 3 and the cylinder 4.

The air valve unit comprises the threaded plug or body 41 which is reduced intermediate its length to provide an annular passage 49 around the upper portion of the air valve chamber 38. Openings 50 are formed in the base of this passage to establish communication to the inner bore 51 of the body 41, the lower end of the body being tapered to provide a valve seat 52 for the air valve 37', this valve being normally forced upwardly against the seat by the compression spring 53 seated in the depression of the threaded plug 40.

To prevent leakage between the stem of the air valve 37' and the plug 5, a spring-pressed gasket or sealing member 54 is provided as shown in Fig. 5, the spring forcing the gasket into sealing contact between the stem and the plug, being of comparatively light tension and indicated at 55 in this figure of the drawings.

In the use of the gauge for inflation purposes only, air under pressure is admitted to the inlet chamber 32 and through the passage 47 leading therefrom into the lower portion 39 of the air valve chamber.

Upon depression of the air valve 37', the valve member on the stem is unseated from the seat 52 permitting air to flow upwardly through the central bore, out through the openings 50 into the upper portion 38 of the chamber 37. From here air flows through the passage 46 downwardly into the outlet chamber 33 and into the tire in the usual manner.

The gauge valve unit 36' is quite similar to the air valve unit with exception that the gasket or sealing member is omitted. The plug 42 is also provided with an annular chamber 49a having ports 50a leading therefrom into the inner bore 51a, the lower portion of the plug or body 42 being formed with a tapered extension forming a valve seat 52a adapted to cooperate with the valve member carried by the stem of the gauge valve 36'.

A compression spring 53a is provided for forcing the valve member against its seat 52a. The under face of the gauge valve finger button member 36" is provided with an annular recess in which is disposed a sealing gasket 56 adapted upon depression of the button to engage with an annular lip or seat 57 formed on the top of the plug 42 and surrounding the stem of the valve. The valve stem of the gauge valve is also preferably notched or flattened on either side to provide an air escape passage 58 for the purpose of permitting air to escape from the inner bore of the plug when the button of the gauge valve 36 is partially depressed.

Under normal conditions with the valve member 36' open, as seen in Fig. 5, the tire pressure gauge is in inoperative position or at rest, as seen in Fig. 3 of the drawings, with the piston and plunger member in its extreme right hand position. When it is desired to take a reading with the gauge, assuming that the tire tap is connected with the valve of the tire to be tested, the operator then fully depresses the button on the upper end of the gauge valve 36'. Under these conditions air from the tire will flow back into the outlet chamber 33, through the passage 45 to the lower portion 39a of the gauge valve chamber. From this point it will flow upwardly past the valve member which has been previously unseated into the central bore 51a, through the ports 50a, and then into the passage 48 which leads to the enlarged chamber around the cylinder 4. (See also Fig. 4).

From this point air passes between the cylinder and the bore toward the outer end thereof and through the notch 6 in the plug 5, thence through the felt washer 10 and through the aperture 7 in the plug 5 to the interior of the cylinder 4.

As pressure is built up in this cylinder, tension of the spring 13 is overcome causing the piston or plunger member 11 to be forced to the left. The indicator member 16 is moved along under the sight opening 17 through which the operator may note the indicia carried by the indicator and its relation to the pointer or arrow members 21.

The initial movement of this plunger, being resisted by the main or low pressure spring 13, is greater than the final movement of the plunger after it engages and picks up the spring carrier or sleeve connecting member 27 and therefore this low resistance, so to speak, produces a greater movement of the indicator and therefore the graduations from ten to forty, 16a of Fig. 7, are farther apart than the graduations 16b and are primarily used in conjunction with low pressure or balloon type tires.

Assuming that a high pressure tire is being tested, the plunger member will be forced to the left sufficiently to cause the piston or rod member 12 to engage the end of the spring carrier or socket 27 and through this engagement move the socket member to pick up the auxiliary spring 29, so to speak, and this spring being tensioned in conjunction with the main or primary spring 13 causes a relatively reduced movement of the indicator member per pound pressure applied on the gauge as the pressure changes.

When a tire is being tested and the operator finds that the pressure in the tire is above the desired amount, he has only to slightly relieve the pressure on the bottom of the valve 36' permitting the same to move upward sufficiently to permit the seat 57 to disengage the gasket 56 in the undersurface of the button. Under these conditions, pressure from the tire will flow from the inlet chamber 33 through the passage 45 and lower portion 39a of the gauge valve chamber upwardly through the inner bore 51a and escape between the flat surface of the valve stem and the annular valve stem guide bore in the plug 42.

When it is desired to take a reading of the service pressure or pressure of the air of the supply reservoir to which the gauge is connected, the operator under these conditions depresses the control button for the air valve 37' as well as the control button for the gauge valve 36'. Under these conditions, pressure from the reservoir will be effective through the inlet chamber 32 and passage 37 and by reason of the depression of the air supply valve 37' pressure will be admitted through the passage 46 into the outlet chamber 33. This outlet chamber is usually provided with a flexible conduit to the end of which is secured a tire valve chuck or tap, as before set forth.

This tap is provided with a check valve so that upon removal of the tap from the tire valve the check valve will close. This structure is conventional and therefore not disclosed in the drawings. It is necessary, however, to mention it here in order to state that pressure will be built up within the outlet chamber 33 upon depression of the air valve 37'.

Since we have assumed that the gauge valve is depressed as well as the air valve in order to determine service line pressure on the indicator, the service or line pressure in the outlet chamber 33 will be effective on the piston member 11 in exactly the same manner as when the button of the valve 36' is depressed to indicate tire pressure, except that due to the higher service pressure the indicator will be moved to a greater extent. If the service or line pressure is excessive, I provide a safety stop means for the main piston or plunger rod 11 and the auxiliary spring carrier or socket member 27, as previously set forth.

Referring now particularly to Fig. 9 of the drawings which shows the plunger rod 12 and the auxiliary spring carrier in their extreme movements as would be the case if excessive pressure was applied to the gauge, it should be observed that the end of the socket member 27 engages the inner face of the plug 25 before the auxiliary spring 29 is compressed solid and under these conditions further compression of the spring is impossible.

The plunger rod 12 is likewise limited in its movement by the inner or closed end of the carrier 27 before the primary or low pressure testing spring 13 is compressed solid and therefore this spring cannot be damaged and therefore neither of these springs can be damaged if excessive pressure is applied to the gauge.

The gauge will show pressure up to the limit of the indications which in the preferred form of my embodiment is 130 pounds. If the pressure was above that no harm would be done although the gauge would show that there was at least 130 pounds of pressure in the system.

Referring to the Figs. 10 and 11 of the drawings, I disclose a slight modification of my invention in which a service pressure tensioning spring is provided as indicated, the supplemental auxiliary spring 59 carried on an inwardly extending tubular extension or boss 60 formed on the inner face of the threaded plug 25', the length of this boss being sufficient to be engaged by the end of the socket member or spring carrier 27 when the spring 59 is fully compressed thereby limiting the movement of the piston rod 12 and at the same time preventing excessive compression or rupture of the spring 59 in this form of invention. The indicator member 16 will be provided with three sets of pressure value indicia as indicated at 16c, 16d, and 16e, indicia 16c and 16d being spaced substantially the same as the indicia 16a and 16b in the previous embodiment. Indicia 16d, however, is primarily for the purpose of indicating the line or service pressures and represents the pressure necessary to move the piston when it is resisted by all three springs or tensioning means 13, 29 and 59.

Suitable cup-shaped screens or dust guards are provided at 61 and 62, the dust guard 61 being disposed in the forward portion of the air outlet passage to prevent dust or foreign matter from entering the gauge when the gauge valve 36' is depressed and the gauge attached to a tire for indicating the pressure or partial deflation thereof. The strainer member 62 is disposed in the end of the inlet passage to prevent foreign matter from entering the gauge from the pressure reservoir or source of air supply.

While I have described my invention herein as applicable particularly to the inflation of vehicle tires, it is quite obvious that its utility is not restricted to this special field as it may be used in conjunction with any inflation operation where it is desired to obtain a quick and sturdy control and an accurate gauging of pressures of varying extent. It will also be apparent that slight changes may be made in the details of construction of the device without departing from the spirit of the invention and within the scope of the claims hereto appended.

I claim:

1. In an air inflation and gauge device of the class described, a casing having an air delivery passage, a gauge chamber and a venting passage leading from said delivery passage, a pressure actuated member in said gauge chamber including pressure indicating means, a gauge control valve intermediate the air delivery passage and the gauge chamber normally preventing passage of air to the gauge chamber and venting passage, said valve being so constructed as to permit movement of the pressure actuated member by the air to afford an air pressure indication when shifted to one position and to vent excess air from said delivery passage through said venting passage when shifted into another position, and valve controlled means for directing air from a source of supply to the delivery passage.

2. In an air inflation and gauge device of the class described, a casing having an air delivery passage, a gauge chamber and a venting passage leading from said delivery passage, a pressure actuated member in said gauge chamber including pressure indicating means, a depressible gauge control valve intermediate the air delivery passage and the gauge chamber normally preventing passage of air to the gauge chamber and venting passage, said valve being so constructed as to permit movement of the pressure actuated member by the air to afford an air pressure indication when fully depressed and to vent excess air from the delivery passage through said venting passage when partially depressed, said casing having an inlet passage communicating with the delivery passage, and means in said inlet passage for controlling flow of air to the delivery passage.

3. In an air inflation and gauge device of the class described, a casing having an air passage, a gauge chamber and a venting passage, a pressure actuated member in said gauge chamber including pressure indicating means, a control valve intermediate the air passage and gauge chamber arranged when seated to close the gauge chamber and vent passage and operable to be unseated to admit air through said air passage into said gauge chamber when shifted one increment of movement to afford an air pressure indication, said valve being so constructed that when shifted a different increment of movement to vent excess air delivered into the air passage through said venting passage, and means in the air passage for interrupting flow of air through the casing when the control valve is unseated as aforesaid.

4. In an air inflation and gauge device of the class described, a casing having an air passage communicating with a source of air supply, a gauge chamber and an air delivery passage, a pressure actuated member in said gauge chamber including pressure indicating means, a gauge control valve intermediate the air delivery passage and the gauge chamber movable to admit air from the air delivery passage to the gauge chamber to afford a pressure indication, and a supplemental valve control means between the air supply passage and the air delivery passage for controlling delivery of air through said casing and permitting passage of air from said source of air supply to said gauge chamber to afford a service pressure indication, under control of the gauge control valve.

5. In an air inflation and gauge device of the class described, a casing having an air passage communicating with a source of air supply, a gauge chamber, an air delivery passage and a venting passage, a pressure actuated member in said gauge chamber including pressure indicating means, a gauge control valve for controlling the venting passage and the introduction of air into the gauge chamber, and a supplemental valve control means for controlling delivery of air from the source of supply to the delivery passage, said valve control means being independently operable to control delivery of air through the casing or delivery of air to said gauge chamber under control of the gauge control valve for pressure indications.

6. In an air inflation and gauge device of the class described, a casing having an air inlet chamber adapted to communicate with a source of air supply, an air delivery chamber for communication with an air receiving receptacle and a gauge chamber communicating with the delivery chamber, a pressure actuated member in said gauge chamber including pressure indicating means, a main control valve for controlling the passage of air from the inlet chamber to the delivery chamber, and a supplemental control valve for controlling passage of air from the delivery chamber to the gauge chamber, both said valves being operable for introducing air from the inlet chamber to the gauge chamber.

7. In an air inflation and gauge device of the class described, a casing having an air passage communicating with a source of air supply, a gauge chamber and an air delivery passage, a pressure actuated member in said gauge chamber including pressure indicating means, a gauge control valve intermediate the air delivery passage and the gauge chamber, a supplemental valve control means between the air supply passage and the air delivery passage for controlling delivery of air through said casing and from said source of air supply to said gauge chamber under the control of the gauge control valve to afford a service pressure indication, said valves being independently or simultaneously operable according to whether a gauge reading of the delivery passage pressure is desired or a gauge reading of the pressure source is desired.

8. An air inflation control device comprising a casing having a longitudinal passage therein at one end constituting an air inlet chamber and a second longitudinal passage constituting an air delivery chamber, said casing having a third passage arranged above the two passages aforesaid, a pressure-actuated plunger mounted in the last-mentioned passage, air pressure indicating means carried by said plunger, resilient means for controlling the movement of said plunger, passages leading from the air inlet chamber and the air delivery chamber to said plunger passage, a valve member arranged at one side of the casing for controlling the passage between the air inlet chamber and the plunger passage and the passage from the air delivery chamber to said plunger passage, said valve having a stem extending through the casing for manipulating the same, and a second valve disposed at the other side of the casing and also having a stem projecting from the casing for operating said second valve, said valves being so constructed and arranged as to be independently or simultaneously operable at will to control the movement of the plunger by the air from the air inlet chamber and from the air delivery chamber to said plunger passage.

9. An air inflation control device comprising a casing, air inlet and delivery chambers in said casing, a gauge chamber associated with said other chambers, and passages establishing communication between all of said chambers, said casing having a venting passage communicating with the air delivery chamber, separate valve means arranged in the communicating passages for controlling the passage of air from the air inlet or air delivery chambers including a valve for the gauge chamber, a stem connected to said valve, and means on said valve stem for closing the vent passage when said valve is operated to establish communication between the air delivery chamber and the gauge chamber.

WALTER H. LONGSTREET.